United States Patent [19]
Mallinder et al.

[11] 3,834,832
[45] Sept. 10, 1974

[54] FIBRE REINFORCED COMPOSITE STRUCTURES

[75] Inventors: Frederick Paul Mallinder, Southport; Clifford George Hannah, Alvaston, both of England

[73] Assignee: Rolls-Royce (1971) Limited, London, England

[22] Filed: Dec. 14, 1972

[21] Appl. No.: 315,194

[30] Foreign Application Priority Data
Dec. 21, 1971  Great Britain .................... 59488/71

[52] U.S. Cl. .................... 416/230, 416/241, 161/50
[51] Int. Cl. ............................................. F01d 5/14
[58] Field of Search ................ 161/48, 50; 156/93; 416/229, 230, 241 A, 224

[56] References Cited
UNITED STATES PATENTS

| | | | |
|---|---|---|---|
| 2,986,487 | 5/1961 | Miller, Jr. ............................. | 156/93 |
| 3,029,173 | 4/1962 | Reinhard ............................. | 161/48 |
| 3,456,917 | 7/1969 | Palfreyman et al. ................ | 416/230 |
| 3,527,629 | 9/1970 | Wylde ............................. | 161/48 X |
| 3,602,608 | 8/1971 | Morley .............................. | 416/224 |
| 3,616,111 | 10/1971 | Raech, Jr. .......................... | 161/48 X |
| 3,642,561 | 2/1972 | Grobner ............................. | 161/50 |
| 3,731,360 | 5/1973 | Stone ...................... | 416/241 A UX |
| 3,737,250 | 6/1973 | Pilpel et al. ................. | 415/241 A X |
| 3,758,232 | 9/1973 | Wallett .......................... | 416/230 X |
| 3,762,835 | 10/1973 | Carlson et al. .................. | 416/230 X |

FOREIGN PATENTS OR APPLICATIONS

| | | | |
|---|---|---|---|
| 1,064,360 | 12/1953 | France ............................... | 161/48 |
| 643,538 | 9/1950 | Great Britain ...................... | 161/48 |

Primary Examiner—Everette A. Powell, Jr.
Attorney, Agent, or Firm—Cushman, Darby & Cushman

[57] ABSTRACT

A fibre reinforced composite structure has two or more layers of fibre reinforced material, the layers being bonded together to provide resistance to delamination by fastening devices which extend transversely of the fibres from the fibre reinforced layers. The fastening devices may be stitches of glass, carbon or boron, metal pins or staples. The metal pins or staples may be etched or notched to increase the surface area. The composite structure is particularly suitable for use as a fan blade for the fan of a by pass type gas turbine engine.

9 Claims, 10 Drawing Figures

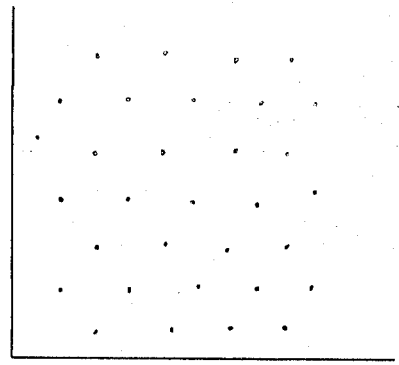
Fig. 7.
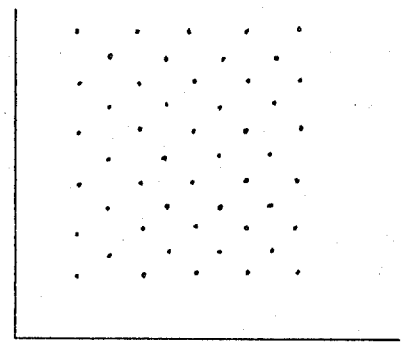
Fig. 8.
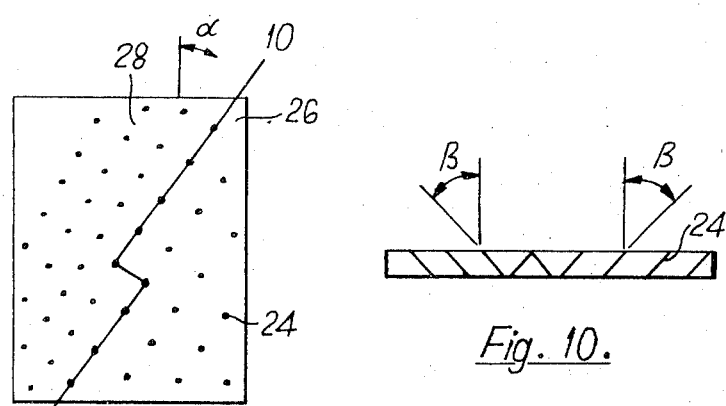
Fig. 9.
Fig. 10.

FIBRE REINFORCED COMPOSITE STRUCTURES

This invention relates to fibre reinforced structures and is concerned with the problem of increasing the resistance of laminated fibre reinforced composite structures to delamination.

Fibre reinforced structures such as aerofoil blades have been proposed for the fans of by-pass gas turbine engines mainly because of the high strength to weight ratio of such blades. It has been found that this type of blade, i.e. one which is made up a number of layers of fibre reinforced composite material tends to delaminate under the impact of say, a bird strike. This failure occurs because normal two dimensionally reinforced composites have relatively low resistance to impact since cracks can be initiated and rapidly propagated through the weak resin matrix planes separating the fibrous laminations. The failure occurs at low energy levels without breaking the fibres and the composite structure therefore lacks toughness.

The present invention seeks to provide a means whereby the resistance of fibre reinforced and laminated composite structures to delamination may be improved.

Accordingly, the present invention provides a fibre reinforced composite structure including at least two layers of fibre reinforced composite material, layers being bonded together and attached by a plurality of fastening means extending transversely of the fibres in the fibre reinforced layers and at least partially through the fibre reinforced layers.

The fastening means may comprise stitches of glass, carbon, or boron fibres inserted by means of a bodkin or metal pins inserted by means of an air gun. Alternatively, the fastening means may comprise metal staples inserted by a stapling machine.

The metal pins or staples may be etched or notched to increase the surface area, thereby increasing the adhesion properties.

The invention may be advantageously applied to the fan blades of the fan of a by-pass type gas turbine engine.

In the case of metal pins or staples, the machines for inserting such fastening means may be programmed to travel a path of constant blade thickness and receive pins or staples of constant length or they may be programmed to travel in straight lines over the preformed blade and receive pins or staples of varying thickness according to the local thickness of the blade. Such machines may also be arranged to insert pins or staples at varying concentrations, as desired.

The length of the pins and staples are so chosen that when the blade is moulded, the pins or staples extend right through all the layers but do not extend beyond any of the surfaces of the blade.

The present invention will now be more particularly described with reference to the following examples of blades made in accordance with the present invention and the drawings in which:

FIG. 1 illustrates the method of testing one form of composite structure made in accordance with the present invention.

FIG. 2 and 3 show two forms of staples suitable for use as fastening means, FIGS. 4, 5 and 6 show three forms of pin which are suitable as fastening means, FIGS. 7 and 8 each show a portion of an article made from a composite material with the fastening means arranged in different patterns, FIG. 9 shows part of a composite article with the fastening means laid out in lines arranged at an acute angle to the fibres of the composite material and FIG. 10 is a section on line 10—10 of FIG. 9.

The energy absorption of a laminated fibre reinforced composite structure is measured by means of a double cantilever cleavage technique in which a crack is propagated between the layers of loading specimens as shown in FIG. 1.

The energy may then be measured from the instantaneous values of crack length L, cleavage force F and cleavage displacement $\delta$ and expressed as ($\gamma$) effective surface energy or energy absorbed per unit area of new surface produced by a slowly propagating crack.

Values of ($\gamma$) for a standard carbon fibre/epoxy composite containing varying amounts of carbon fibre stitches are as follows:

| No. of stitches per sq. in. | Stitch, Weight gm. in$^{-1}$ | Effective Surface Energy ($\gamma$) Erg cm$^{-2}$ |
|---|---|---|
| 0 | 0 | $2 \times 10^5$ |
| 8 | 0.02 | $7 \times 10^5$ |
| 8 | 0.035 | $10 \times 10^5$ |
| 8 | 0.078 | $18 \times 10^5$ |

A further improvement is achieved if the "stitches" are arranged to pull out during the process of delamination rather than break. In this way a number of stitches are operating simultaneously, bridging the advancing crack behind the crack tip and hence a large amount of energy is dissipated by the faces of the slipping fibre in friction.

An example of this improvement is illustrated below:

Carbon Fibre Epoxy Composite
(Brightray wire stitches) 2 × 0.012″ dia.

| No. of stitches per sq. in. | Type of failure | ($\gamma$) erg. cm$^{-2}$ |
|---|---|---|
| 8 | Stitches broken | $1.2 \times 10^6$ |
| 8 | Stitches pulled out | $2.3 \times 10^6$ |

A novel method for achieving this effect is to simply staple the layers together prior to moulding with conventional metal staples having sufficient strength to resist fracture. The advantages of this technique compared with stitching or other means of achieving 3rd direction reinforcement are:

a. Simple, quick and cheap.

b. Staples, punch their own holes, which are of minimum size and hence fewer structural fibres are broken in the other two principal planes.

Examples:
Carbon Fibre Epoxy Composite
Steel Staples Weight 0.11 gm.in$^{-1}$

| No. of Staples per sq. in. | Type of Failure | ($\gamma$) erg cm$^{-2}$ |
|---|---|---|
| 2 | Staples pulled out | $2.3 \times 10^6$ |
| 4 | Staples pulled out | $3.0 \times 10^6$ |
| 8 | Staples pulled out | $7.4 \times 10^6$ |

Again more energy is absorbed with increasing density of stapling, but this is at the expense of e.g. flexural strength retention in the other directions.

However at an acceptable density and strength retention further improvements may be achieved by:

a. increasing the surface area of the staples (e.g. by etching)

b. increasing the bond between the resin matrix and staple.

c. notching the staples to provide a mechanical key when moulded.

The mechanism of energy absorbing now involves not only increased friction during slipping, due to the larger surface area, but breaking of mechanical keys and stronger bonds.

Furthermore since normal staples have a bridging member which contributes nothing to this mechanism but adds unnecessary weight and disturbs surface structural fibres during subsequent moulding, the bridging member is dispensed with and "stapling" with metal pins of similar dimensions to the staple legs can be used. These can also be rapidly inserted into the uncured pack of laminates before moulding with a standard air operated stapling gun.

It has been found that at modest "stapling" densities and when the pins have been surface treated and/or notched, cracks can no longer be propagated between the laminates but become diffused.

The criterion for judging the performance of such composites in the cleavage test used is based on the maximum load required to fail the specimen in whatever mode of failure it now chooses (usually flexural failure).

Examples
Carbon Fibre Epoxy Composite
Steel Staples    0.029" × 0.035" (FIGS. 2 and 3).
Steel Pins       0.050" × 0.065" (FIGS. 4 and 5).
Notches          0.010" deep × 0.030" wide (FIGS. 3 and 5)

| Type of reinforcement | Penetrations per sq. in. | Max. Load Kgm |
|---|---|---|
| Staples — untreated | 8 | 46 |
| Staples — etched and primed | 8 | 60 |
| Staples — untreated | 16 | 79 |
| Staples — notched | 16 | 96 |
| Pins — untreated | 8 | 58 |
| Pins — notched | 8 | 68 |
| Pins — notched | 16 | 105 |

FIG. 2 shows a standard staple 10 of approximately rectangular section (0.029 × 0.035 inches) and FIG. 3 shows a standard staple 12 which is notched at 14 to provide a mechanical key when moulded, the notches only being provided on the outer side of the limbs of the staple, Similarly FIGS. 4 and 5 show a plain steel pin 16 of rectangular cross-section (0.050 × 0.065 inches) and a notched pin 18 which has five slots 20 on one side and four slots 22 on the other, the slots on one side being staggered with respect to the slots on the other side of the pin.

FIGS. 7 and 8 show small portions of articles made from fibre re-inforced composite material and illustrate two ways in which the fastening means can be arranged. In FIG. 7, the fastening means, the pins 24 in this example, are arranged in a hexagonal pattern with a pin in the centre of each hexagon and in FIG. 8, the pins are arranged in squares, with a pin in the centre of each square.

Figure 1:
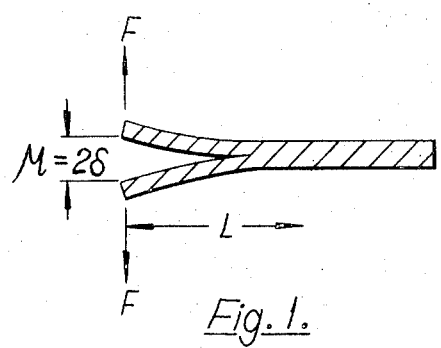
Figure 2:
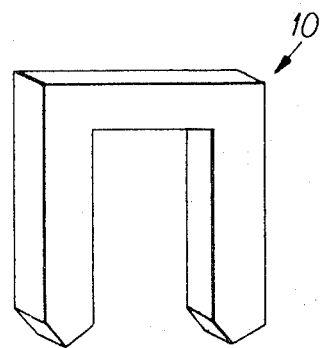
Figure 3:
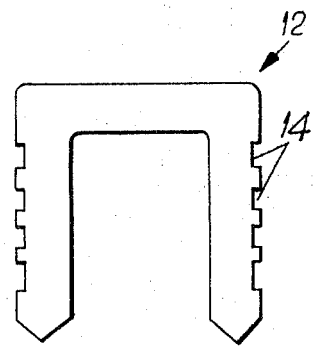
Figure 4:
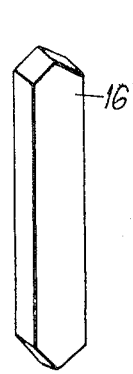
Figure 5:
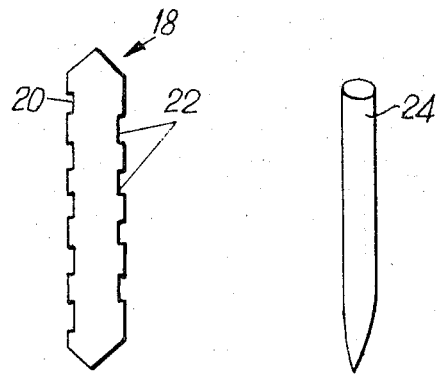
Figure 6:
FIG. 6 shows a circular cross-section pin 24 which is made from a standard dress making pin manufactured under the brand name 'DORCAS'. The pin heads are removed, the pins are cut to the required length and shaken for 15 minutes with a small quantity of 90 mesh silicon carbide grit.

FIG. 9 is a small portion of an article made from fibre reinforced composite material with the fibre 26 arranged substantially parallel with the edge of the article. The pins 24 are arranged in lines 28 which are arranged at an acute angle $\alpha°$ to the direction of the fibres 26.

Additionally, as shown in FIG. 10, the pins 24 can be arranged at an angle $\beta$ (preferably up to 30°) from the vertical in the vertical plane containing a row of pins and the pins in alternate rows can be inclined in opposite senses.

In a further arrangement, not shown, the pins or limbs of staples may be threaded to provide a mechanical key.

What we claim is:

1. A gas turbine engine blade comprising at least two layers of fiber reinforced composite material, each layer comprising a parallel array of fibers in a resin matrix, the layers being resin bonded together and, in combination, further attached together by a plurality of fastening means extending transversely of the fibers in the fiber reinforced composite layers and at least partially through the fiber reinforced composite layers, the blade having improved resistance to delamination under impact.

2. A gas turbine blade as claimed in claim 1 in which the fastening means comprise stitches of a material selected from the group consisting of glass, carbon and boron fibers.

3. A gas turbine blade as claimed in claim 1 in which the fastening means comprise metal articles selected from the group consisting of circular and rectangular cross section pins and rectangular cross-section staples.

4. A gas turbine blade as claimed in claim 3 wherein the surface of the metal articles are rough.

5. A gas turbine blade as claimed in claim 3 wherein the surfaces of the metal articles are notched.

6. A gas turbine blade as claimed in claim 1 wherein the fastening means are positioned in lines which at an acute angle to the direction of the fibers in the fiber reinforced layers.

7. A gas turbine blade as claimed in claim 1 wherein the fastening means are positioned in a hexagonal pattern having a fastening means at the center of each hexagon.

8. A gas turbine blade as claimed in claim 1 wherein the fastening means are positioned in a square pattern having a fastening means at the center of each square.

9. A gas turbine blade as claimed in claim 1 wherein the fastening means are positioned in an oppositely inclined arrangement in rows adjacent each other.

* * * * *